US007543054B1

(12) United States Patent
Bansod et al.

(10) Patent No.: US 7,543,054 B1
(45) Date of Patent: Jun. 2, 2009

(54) MINIMALIST DATA COLLECTION FOR HIGH-SPEED NETWORK DATA MONITORING BASED ON PROTOCOL TREES

(75) Inventors: Shilpa Pradeep Bansod, Cupertino, CA (US); Venkatesh Ramachandran Iyer, Cupertino, CA (US)

(73) Assignee: Network General Technology, George Town (KY)

( * ) Notice: Subject to any disclaimer, the term of this patent is extended or adjusted under 35 U.S.C. 154(b) by 789 days.

(21) Appl. No.: 11/133,997

(22) Filed: May 20, 2005

(51) Int. Cl.
*G06F 15/173* (2006.01)
(52) U.S. Cl. .................. 709/224; 709/230; 726/13; 370/469
(58) Field of Classification Search ............... 709/224, 709/230; 726/13; 370/469
See application file for complete search history.

(56) References Cited

U.S. PATENT DOCUMENTS 5,850,388 A * 12/1998 Anderson et al. ........... 370/252
7,433,947 B1 * 10/2008 Iyer et al. .................. 709/224
2004/0083299 A1 * 4/2004 Dietz et al. ................. 709/230

* cited by examiner

*Primary Examiner*—David Lazaro
(74) *Attorney, Agent, or Firm*—Fenwick & West LLP

(57) ABSTRACT

According to one embodiment, a network architecture includes a plurality of application monitoring modules for monitoring network traffic data that store the data in meta-flow tuples with associated measures. The meta-flow tuples include a protocol dimension with a value corresponding to a leaf node in a protocol identifier array. The protocol identifier array represents a protocol tree structure based on a set of nodes with pointers to parent, sibling, and child nodes corresponding to the protocol tree. The pointers include protocol identifier values that correspond to memory offset values with respect to the array. For queried protocol dimensions, the protocol identifier array is used to traverse the protocol tree from the leaf node in the meta-flow to a matching node matching the queried protocol. If the queried protocol is found in the protocol lineage of the meta-flow, the measures for the meta-flow are used to satisfy the query.

23 Claims, 13 Drawing Sheets

MINIMALIST DATA COLLECTION FOR HIGH-SPEED NETWORK DATA MONITORING BASED ON PROTOCOL TREES

RELATED APPLICATIONS

This application is related to U.S. application Ser. No. 11/134,808 titled "HyperLock Technique For High-Speed Network Data Monitoring" and filed on May 20, 2005, and which is incorporated herein by reference in its entirety.

FIELD OF THE INVENTION

The present invention relates generally to network traffic monitoring and more specifically to minimalist data collection and processing techniques for network traffic data based on protocol trees.

BACKGROUND OF THE INVENTION

Networks are used to interconnect multiple devices, such as computing devices, and allow the communication of information between the various interconnected devices. The large impact that information technologies have on our daily lives are primarily enabled by the ability of networks to carry data from one place to another almost instantly. Most people today use data transferred through a network in their daily activities, such as using the Internet to get information, communicate (e.g., with cellular phones, e-mail devices, mobile computing devices, or the like), conduct electronic business, and many other daily activities. In the work environment, many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases, or to collaborate in the preparation of documents. Therefore, a network failure or inefficient operation significantly impacts the ability of enterprises, individuals, or groups to perform their functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another. If a particular network device or network communication link fails or underperforms, multiple devices, or the entire network, may be affected. To avoid network failures or performance problems network monitoring and management tools are provided to mange the networks.

Network management is the process of managing the various network devices and network communication links to provide the necessary network services to the users of the network. Typical network management systems collect information regarding the operation and performance of the network and analyze the collected information to detect problems in the network. For example, a high network utilization or a, high network response time may indicate that the network (or a particular device or link in the network) is approaching an overloaded condition. In an overloaded condition, network devices may be unable to communicate at a reasonable speed, thereby reducing the usefulness of the network. In this situation, it is important to identify the network problem and the source of the problem quickly and effectively such that the proper network operation can be restored.

One purpose of a network is to provide a forum in which applications can pass information from one location to another across the network. These are commonly referred to as networked applications and are typically designed for specific usage. Examples may include mail applications, financial transactions, streaming media, medical imagery, or airline travel reservations. A given corporate or government network may have dozens or thousands of such applications simultaneously in use.

Timely determination and resolution of network failure and/or performance problems is very important and even critical to the viability of many business enterprises. A network failure can cause very large financial losses. For example, businesses relying on electronic transactions for the sale of products have a critical need for their networks to be operating to enable sales. Even a slowdown of data transfer rates can have a large financial impact due to lower productivity, sales, customer frustration, and the like.

To avoid and quickly resolve network problems, operators are required to monitor and troubleshoot network traffic and correlate application performance with network problems. In highly complex networks, data traffic is transmitted according to a multiple protocols at different levels of the communication process, e.g., open systems interconnection ("OSI") network layer protocols. Moreover, the communications protocols are also determined by the top level applications, which in some circumstances may be the main source of network delays or failures.

Therefore, network administrators have a need to collect and monitor protocol information in order to understand resolve network performance problems. Conventional network data capturing systems for network monitoring generally require a high level of redundant data storage and computation across the multiple levels of network communications. For example, network traffic measures associated with each of the protocols in each of the levels of a network communication are conventionally collected and stored with respect each level and its associated protocols. This conventional data collection and storage techniques do not scale in terms of performance for the application space where protocol depths are very high due to the large diversity in application level protocols and by being at the top level in the communications infrastructure.

Moreover, some of the conventional protocol identifiers used in the collection of data for network monitoring are highly space inefficient. For example, viz.OID type representations of application protocol lineage (e.g., for hyper-text transfer protocol ("HTTP") over inter-switch-link protocol ("ISL") the OID would be "ISL.Ethernet.IPv4.TCP.HTTP") are very redundant and space consuming. For a typical network communication at least eight levels of protocols in the typical protocol stack are common. In addition, in order to collect network traffic measures for different levels of the protocol stack for a particular communication, the measures are generally collected with respect to each level desired. Thus, for the same communication multiple instances of a flow are stored with associated measures relevant to each of the protocol levels to be monitored. Moreover, there are more than 1500 possible combinations of protocols, each with potentially some relevant significance. For example, communications for an HTTP application through different link layer protocols (e.g., Ethernet.IPv4.TCP.HTTP or HTTP over plain Ethernet versus ISL.Ethernet.IPv4.TCP.HTTP or HTTP over ISL) may result in different traffic performance patterns useful in resolving a network performance problem. Accordingly, the combination of the inefficient storage with the large number of possible combinations result in a required amount of data that is too large for the fast and efficient performance typically required in real-time network monitoring applications.

Accordingly, there is a continuing need for a data collection techniques for network-monitoring systems used in network monitoring and management that can (1) efficiently store and retrieve protocol lineage information, (2) for all levels and combinations of protocols, and (3) with minimalist data collection requirements.

SUMMARY OF THE INVENTION

The present invention provides an efficient mechanism to store and retrieve protocol lineage information for network communications with minimalist data collection requirements. In addition, based on minimal data collection with respect to protocol information, techniques according to embodiments of the present invention enable the rolling up of network traffic measures over any protocol or combination of protocols at any level of the network protocol stack or even at higher application and file type levels.

In accordance with one embodiment, a computer based method, system, and computer readable media is provided for collecting network traffic data. In one embodiment, a protocol tree structure is derived. Based on information in the protocol tree structure, a protocol identifier array is generated. The protocol identifier array includes storage for a plurality of levels. Each level in the array includes one or more nodes associated with a protocol identifier. The protocol identifiers correspond to an offset from an initial storage location associated with the protocol identifier array. A protocol identifier corresponding to a leaf node in the protocol identifier array is stored in a data object associated with network traffic data for a network communication between two end points.

In accordance with another embodiment, a computer based method, system, and computer readable media is provided for monitoring network data traffic. A leaf node protocol identifier is received from a data object associated with network traffic data for a network communication between two end points. The data object includes one or more network traffic measures associated with the network communication. A protocol identifier array is accessed based on the leaf node protocol identifier. The protocol identifier array includes a plurality of nodes that represent a protocol tree structure. Each node includes a protocol identifier of parent node for traversing the protocol identifier array from the leaf node to a root node. The protocol identifiers in the array provide a means to identify the lineage of protocols associated with the network communication. The protocol identifier array is traversed from the leaf node to each successive parent node comparing each node's protocol with in the lineage of protocols with a queried protocol to find a matching protocol. In response to finding the matching protocol, a value is aggregated based on the network traffic measures of the data object.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF PREFERRED EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. For purposes of this discussion, blocks of flowchart illustrations, combinations of blocks in flowcharts, or any other functional description of elements or modules of the embodiments should be understood to be implemented in software, hardware or any combination thereof. When implemented as software, the computer program instructions may be provided to a computer processor or other programmable data processing apparatus to produce a machine that operates as described. These computer program instructions may also be stored in any computer-readable media that can direct a processor or other programmable data processing apparatus to function as described herein, such that the instructions stored in computer-readable media produce articles of manufacture including program instructions that implement the functions described.

Network Infrastructure

Figure 1:
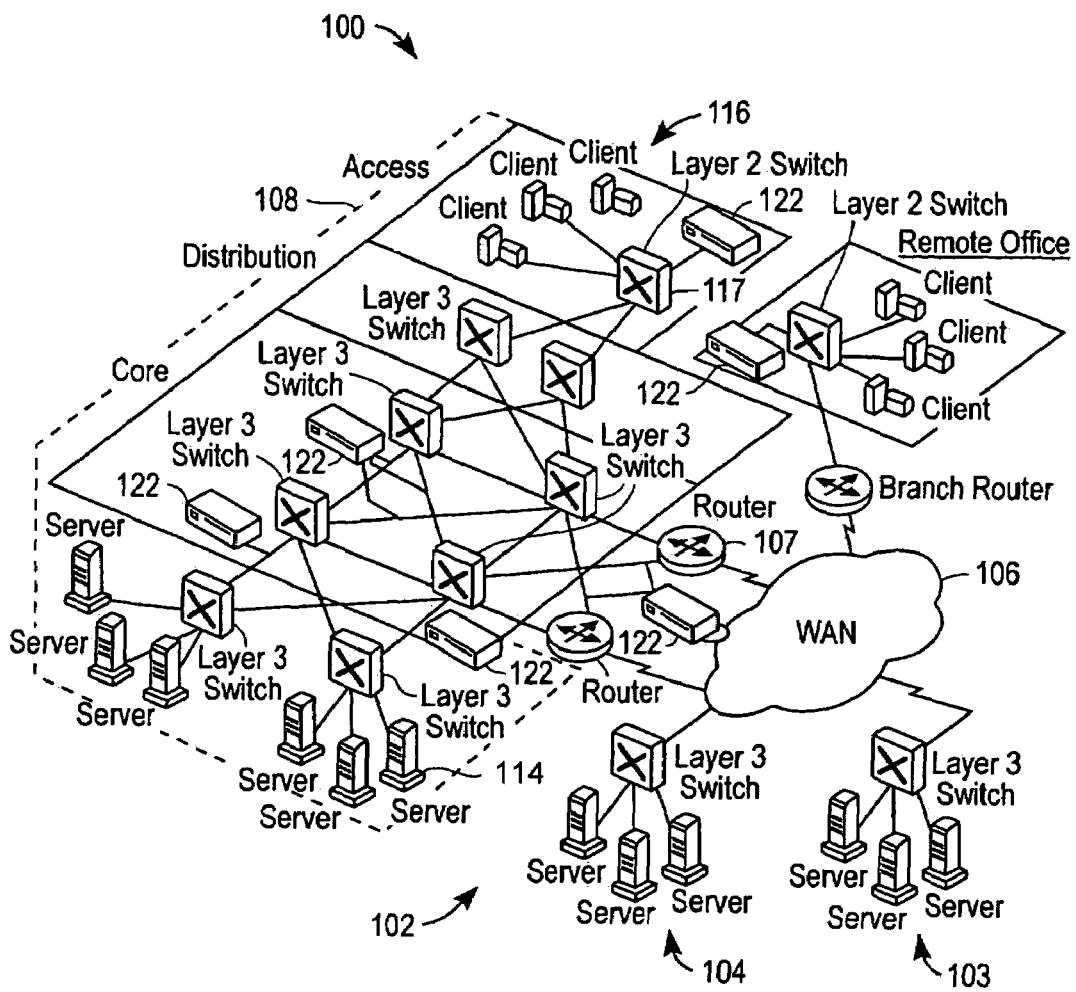
FIG. 1 shows a generic illustration of a network architecture according to one embodiment.

FIG. 1 shows a generic illustration of a network architecture according to one embodiment. In this embodiment, a plurality of remote networks 102 are provided, including a first remote network 103, and a second or more remote networks 104, 106 (generally 102). Also included is at least one gateway 107 coupled between the remote networks 102 and a proximate or enterprise network 108. In the context of the present network architecture 100, the networks 103, 104, 106 may each take any form including, but not limited to a local area network (LAN), a wide area network (WAN) such as the Internet, etc.

Gateway 107 serves as an entrance point from the remote networks 102 to the proximate network 108. As such, the gateway 107 may function as a router, which is capable of directing a given packet of data that arrives at the gateway 107, and a switch, which furnishes the actual path in and out of the gateway 107 for a given packet.

Further included is one or more data servers 114 coupled to the proximate or enterprise network 108. Data servers 114 are accessible from the remote networks 102 via the one or more gateways 107. It should be noted that the data server(s) 114 may include any type of computing device/groupware. Preferably, coupled to data servers 114 are a plurality of client devices 116. Such client devices 116 may include desktop computers, lap-top computers, hand-held computers, printers or any other type of logic or computing devices. It should be noted that client devices 116 may be directly coupled to servers 114, which provide access for clients 116 to the network 108/102 or may have direct access to the network 108/102 via a gateway/router switch 117.

In one embodiment, a distributed monitoring system is coupled to the enterprise network 108 at one or more network segments. One or more network monitoring devices 122, such as for example, Sniffer® Distributed s4000 or s6000 modules by Network General Corporation, of San Jose, Calif., are deployed throughout critical segments of the enterprise network 108. Network monitoring devices 122 may be coupled to network elements such as routers, gateways, and the like. It should be noted that additional monitoring systems and/or components thereof may be utilized with any type of network element coupled to the networks 103, 104, 106, 108. In the context of the present description, a network element may refer to any component of a network.

Figure 2:
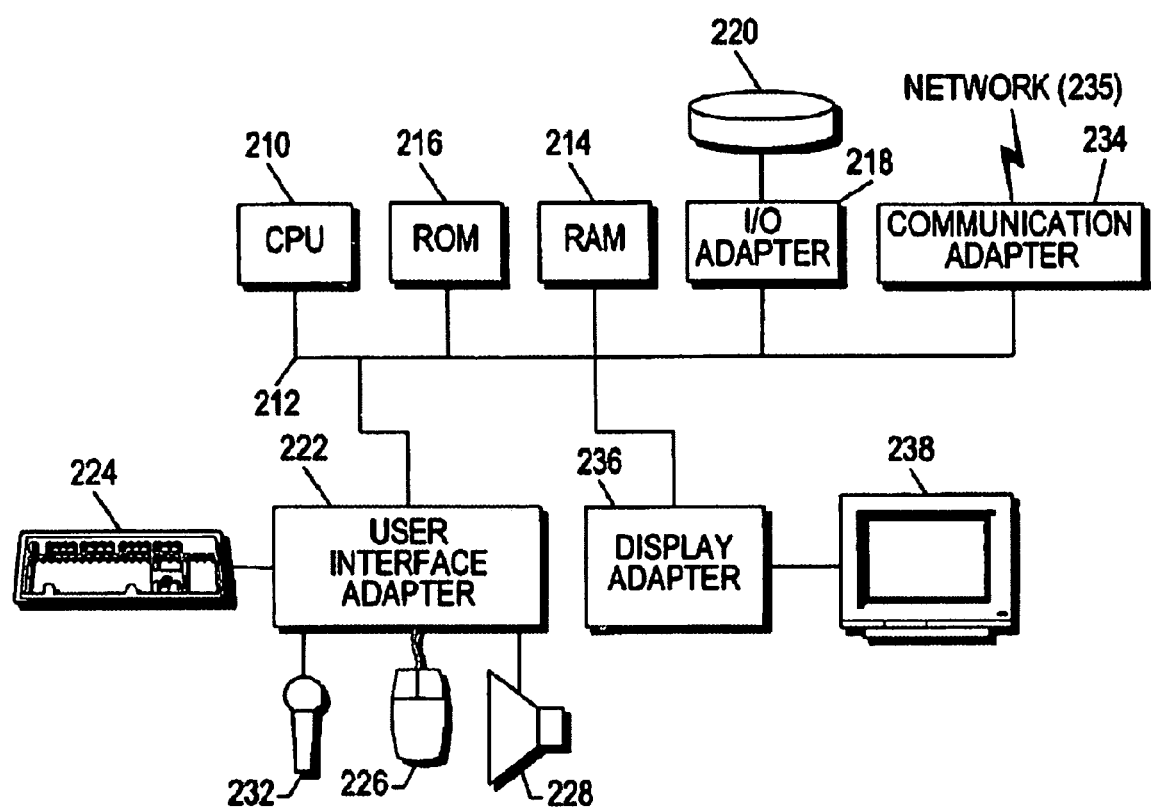
FIG. 2 shows a block diagram of a representative hardware environment of a sample end-point network device in accordance with one embodiment.

FIG. 2 shows a block diagram of a representative hardware environment of a sample end-point network device in accordance with one embodiment. In one embodiment, the representative hardware environment shown may be associated with, for example, a client device 116 of FIG. 1. Such figure illustrates a typical hardware-configuration of a workstation having one or more central processing units 210, such as microprocessors, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows®NT, Microsoft Windows®2000, XP, or any other Microsoft® based Operating System (OS), the MAC® OS, or UNIX/Linux operating system. It will be appreciated that a preferred embodiment may also be implemented on platforms and operating systems other than those mentioned. A preferred embodiment may be written using XML, JAVA, C, and/or C++ language, or other programming languages, along with an object oriented programming methodology. Object oriented programming ("OOP") has become increasingly used to develop complex applications.

The following sections provide a high-level description of an architecture for network monitoring and management system according to one embodiment. The system includes a set of application monitoring and management tools that provide monitoring for business critical applications and network performance information to administrators such as chief information officers ("CIOs") and enterprise network managers.

Network Monitoring Devices

According to one embodiment, the system provides distributed multi-segment network monitoring and correlation functions, with a focus on protocol to application performance monitoring. This multi-segment capability can be extended to multi-site monitoring and correlation (e.g. nodes placed at different geographical locations). The system is preferably based on a scalable, high-performance, open architecture, which can be easily adapted to support many different topologies and features.

Figure 3:
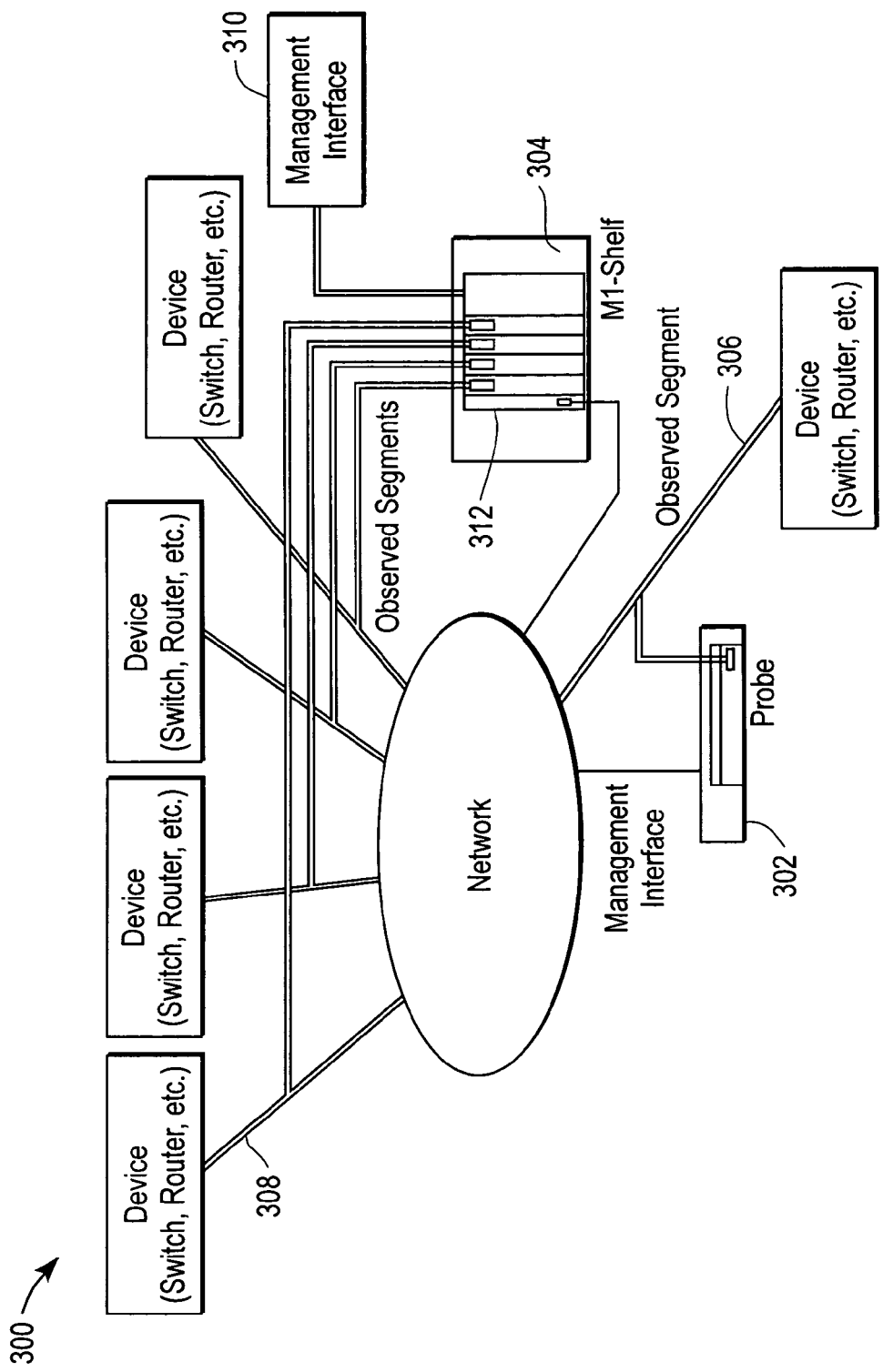
FIG. 3 shows a block diagram of a sample application monitoring system according to one embodiment.

FIG. 3 shows a block diagram of a sample application monitoring system according to one embodiment. As shown, the system 300 can include single-interface probe topologies, multi-interface distributed topologies, or any combination thereof.

For a single-interface probe topology, a single-interface probe network monitoring device 302 is attached to a network port of a network device to monitor traffic in the associated segment 306. For example, in one embodiment, a portable microprocessor-based computing device with a 10-base T Ethernet connector and packet capturing and processing software is configured to probe a network segment upon reporting of a problem with a device attached to the segment in question. One example of such a system is Sniffer® Portable, by Network General Corporation, of San Jose, Calif., which provides these easy deployment capabilities for monitoring network segments as needed.

In an alternative embodiment, a multiple interface probe distributed monitoring system 304 includes a rack-type system with a plurality of multi-port network monitoring devices 312 coupled through hardwired or wireless connections to several network segments 308 for traffic capturing and observation. A management interface 310 provides access to the traffic data collected by the monitoring devices 312 and for further processing and visualization as described herein.

Preferably, regardless of the topology deployed, the system 300 may include two components: an application server module and one or more monitoring modules 302/312. The role of the monitoring modules 302/312 is to provide a physical observation point of network traffic on a given segment 306/308. The application server may be included in the management interface 310 to provide administrative functions (i.e. user interface, provisioning, reports, alarms and statistics, Simple Network Management Protocol (SNMP) agent, etc.) for the system 300. For example, in a single-interface configuration, a single monitoring interface is available in a self-contained, managed device, similar to a typical Remote Network Monitoring (RMON) probe.

In the multi-interface configuration, a larger system is possible by providing multiple interfaces (monitoring devices 312), which allows monitoring and real-time correlation of multiple (co-located) network segments 308. Preferably, in both arrangements, no higher-layer management console is required. The distributed configuration also allows the mixing and matching of different monitoring module types (e.g., Sniffer® s4000, s6000, or the like). One exemplary benefit of this configuration would be to monitor traffic seen on the WAN-side of a router, on a backbone, and on individual branch segments all from the same system, providing a complete network view from a single administrative point.

Figure 4:
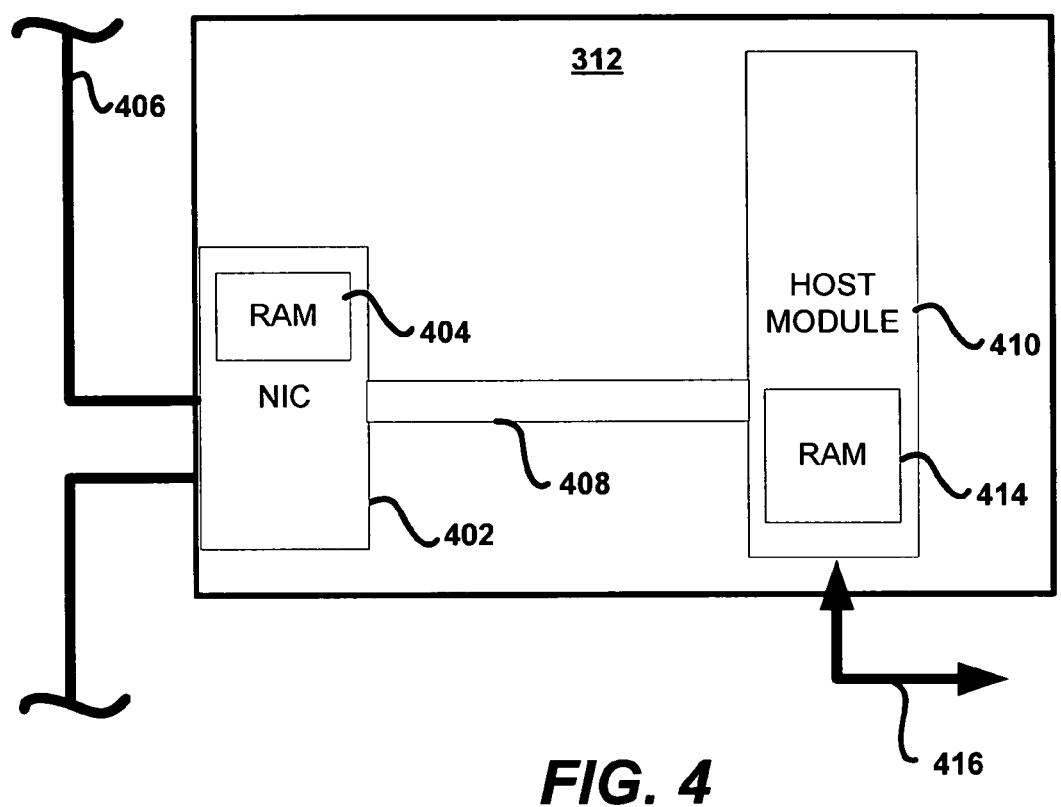
FIG. 4 shows a functional block diagram illustrating a network monitoring appliance according to one embodiment.

Now referring to FIG. 4, a functional block diagram illustrating a network monitoring appliance according to one embodiment is shown. The monitoring device 312 is connected to the network in an inline configuration, a physical transmission medium 406 of the network segment, e.g., an Ethernet cable, is spliced into the device 312. Although for illustration purposes an inline configuration is shown, it should be noted that other configurations, e.g., tap, wireless, or the like are possible as would be understood by a person of ordinary skill in the art. The network transmission medium 406 is connected to a processing module 402, e.g., a network interface card ("NIC"). The processing module includes hardware to electrically couple the network transmission medium 406 to the monitoring device 312 for receiving network traffic data. The network processing module may include conventional Ethernet networking, IEEE 802.11 wireless networking, or any other desired networking protocol capabilities. The processing module 402 includes a local data storage device 404, e.g., random access memory ("RAM") or the like.

The processing module 402 is connected to a host module 410 through a connection circuit 408, e.g., a bus. In one embodiment, the connection between the two modules is a high speed interconnect circuit such as a Peripheral Component Interconnect ("PCI"), PCI-X, serial peripheral interface ("SPI"), SPI-3, SPI-4, or the like. Preferably, the host module 410 is a processor based device, such as a microprocessor, embedded processor, multi-processor subsystem, field programmable gate array ("FPGA") chipset, or the like. The host module 410 includes a local memory device 414. Preferably, the local memory device 414 is a fast access memory device, e.g., RAM, flash memory, or the like. In one embodiment, the host module 410 is coupled to a visualization module (not shown) through a data bus 416 to access traffic data, e.g., directly from the local memory device 414.

Network Traffic Data Collection

Figure 5:
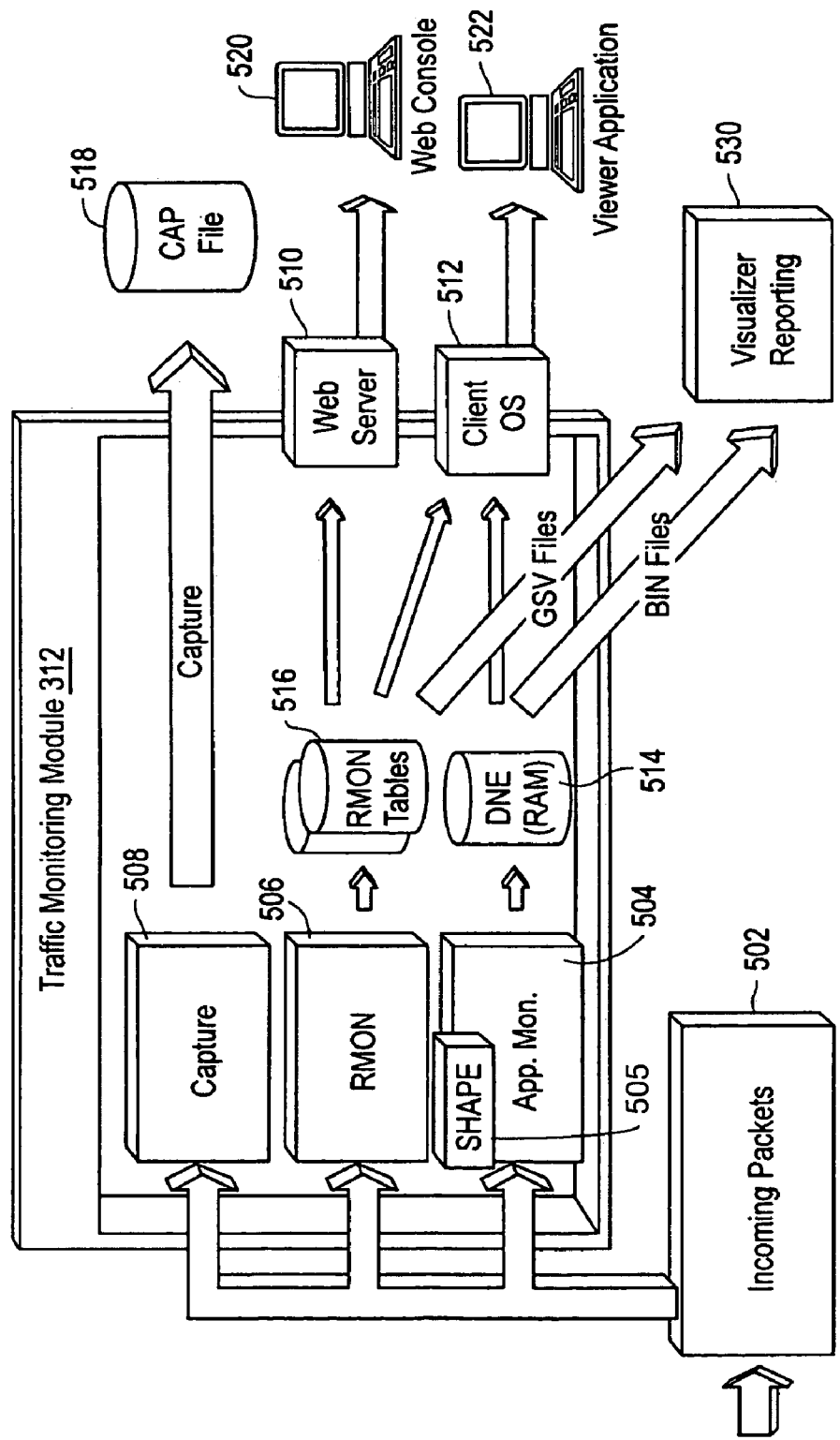
FIG. 5 shows a dataflow diagram in a traffic monitoring module according to one embodiment.

Now referring to FIG. 5, a dataflow diagram in a traffic monitoring module according to one embodiment is shown. Network monitoring devices 312 may collect and monitor network traffic data for multiple purposes. With respect to one embodiment, the packet data 502 is received and distributed to one or more modules, optionally including an application monitoring module 504, a conventional remote monitoring ("RMON") module 506, and a capture module 508.

The capture module 508 captures and formats the packet data in a predefined format, e.g., according to cap file structure, and sends the data to a packet store database 518. The packet database 518 may be accessed by applications to for example review traffic in a segment after a failure occurred.

The RMON module 506 arranges and stores the packet data into conventional RMON tables 516 for remote monitoring through a web server 510 accessible to a user through a web console or browser 520. Alternatively, the RMON tables 516 may be accessed through a client operating system ("OS") 512 by a user viewer application 522 for remote monitoring.

The Application Monitoring Module 504 collects and aggregates packet data according to one embodiment. The Application Monitoring Module 504 includes a packet classification and analysis ("PCA") engine 505. In one embodiment, the PCA engine 505 may operate in the module's kernel to track network flows, create data structures in a "master table" for the flows, and collect information about the flows, such as IP addresses of end points, TCP/UDP port numbers, virtual circuit identifiers, and the like. The PCA engine 505 may also perform deep sub-classification of user applications found in the traffic and calculates response time metrics for the flows. For example, one example of a PCA engine 505 includes the Sniffer Hybrid Application Performance Engine ("SHAPE") by Network General Corporation, of San Jose, Calif. The flow data is collected from the master table, organized and stored in a data normalization engine ("DNE") 514, preferably in memory, e.g., RAM, for fast access and querying. The DNE 514 may be accessed by a client OS 512 for interaction with a user viewer application 522. Alternatively, in one embodiment, the DNE 514 data is stored in project data files, e.g., .bin files, for subsequent access by visualizing and reporting modules 530, for example, in a multi-segment system.

Figure 6:
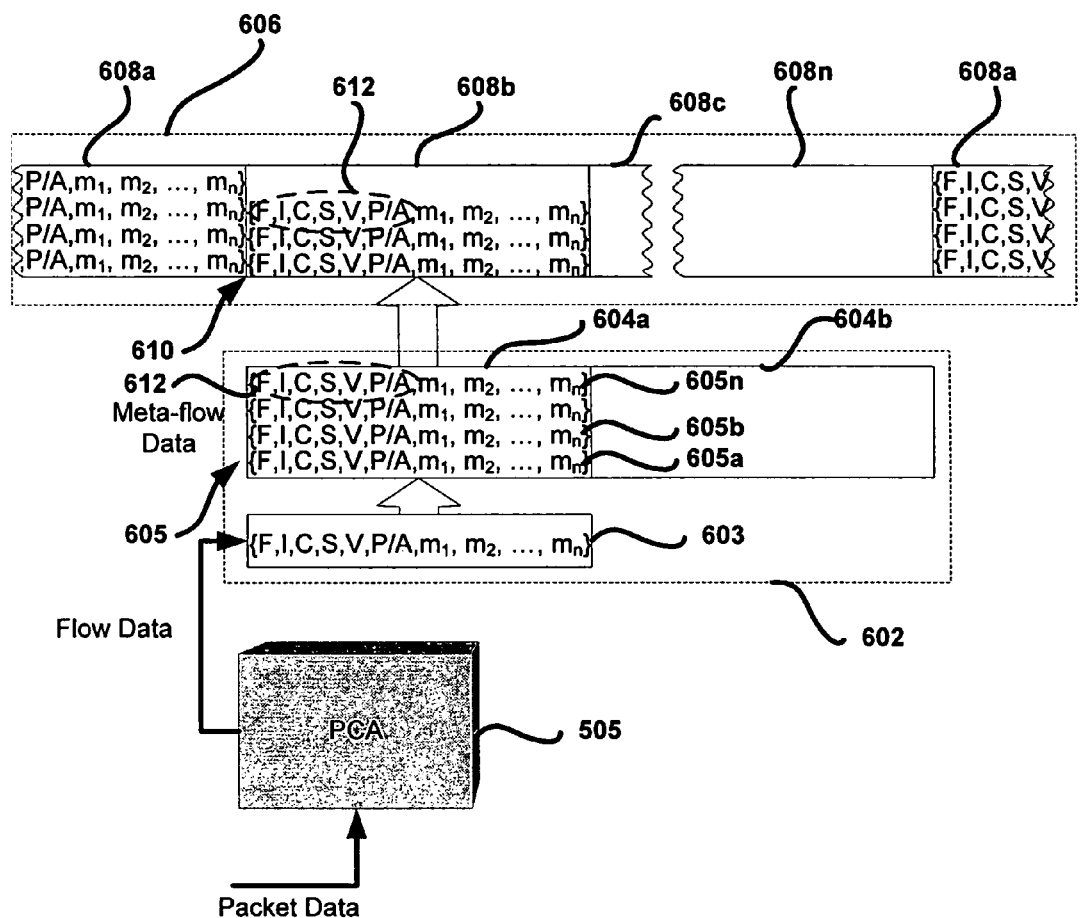
FIG. 6 shows a data flow diagram illustrating data flow in staging and indexing areas according to one embodiment.

Now referring to FIG. 6, a data flow diagram illustrating data flow in staging and indexing areas according to one embodiment is shown. In this embodiment, an Application Monitoring Module 504 includes a master table staging area 602 in a first level store, e.g., RAM in a NIC, for the initial aggregation of flow data received from the PCA engine 505. Preferably, the staging area 602 operates at the kernel level for fast collection of traffic data from the PCA engine 505. The staging area 602 includes a set of buffers or time buckets 604 to contain the data collected from the PCA engine 505. Optionally, an input buffer 603 may receive flow data from the PCA engine 505 and transfer the flow data in a corresponding meta-flow in the time bucket 604 while aggregating the measures for each meta-flow.

Within each time interval I, as flow data is received from the PCA engine 505, a set of dimension values are examined to determine a tuple 612 that uniquely identifies a meta-flow corresponding to a conversation between two network end-points. For each tuple 612 determined, if the tuple 612 is not already in the current bucket 604, a new row 605 is created. If the tuple 612 already exists, the measures for the tuple 612 are updated by aggregating the flow value with the existing value, either by adding or otherwise calculating the corresponding measure, e.g., min/max, and the like. In one embodiment, the tuple-based data aggregation process is similar to the tuple-based data aggregation process for protocol tables described in U.S. Pat. No. 6,751,627, to Sternin, (Jun. 15, 2004), titled "Method and Apparatus to Facilitate Accessing Data in Network Management Protocol Tables," assigned to the assignee of this invention, and incorporated herein by reference.

Within each time interval bucket 608, a plurality of cells 610 store tuples of traffic data and corresponding measures. Each unique tuple defines a meta-flow representative of a conversation between two end points in the network. In one embodiment, a tuple 612 includes a set of dimensions with variable values. For example, tuple dimensions may include clients ("C"), servers ("S"), protocol ("P"), application ("A"), virtual circuit ("V"), network segment ("F"), time interval ("I"), and the like, including combinations thereof. For example, in one embodiment, a single dimension is used for the protocol or application value, i.e., protocol/application ("P/A") dimension. For clients and servers the tuple values may include an internet protocol ("IP") address, medium access control ("MAC") address, a machine network name, or the like. Likewise, in one embodiment corresponding network traffic measures for the meta-flows may include response time, server delay, network time, number of retransmissions, packet size distribution, byte and packet counters, and the like.

In one embodiment, a meta-flow tuple includes a protocol/application dimension. The protocol/application dimension includes a unique protocol identifier ("UPID"). In this embodiment, the UPID dimension may replace or be used in addition to the protocol P and application A dimensions. Moreover, the use of a single UPID dimension for a single meta-flow representative of a network communication between two end-points is preferable for minimalist data collection purposes. In this embodiment, network traffic measures for a network communication between any two end-points are preferably stored with respect to only one unique tuple. The UPID dimension value is determined according to a protocol tree as further described below. It should be noted that, although for minimalist data collection purposes it would be less efficient, the UPID and the associated techniques described below are equally applicable with respect to the collection and storage of multiple tuples for a single network communication, at the flow, or even at the packet level.

Network Protocol Tree and UPID Determination

According to one embodiment, a first step in enabling a minimalist data collection for protocol/application based network traffic monitoring includes the compilation of a protocol tree.

In one preferred embodiment, a network infrastructure may be explored to determine all the possible protocols at each layer of the communications to be carried within the network. A network administrator, network engineer, or the like may perform a study of the network, for example from archived network traffic data, and compose a network tree with each protocol stack layer and the protocols for each layer used in the network. Moreover, applications and even file types for particular applications may be included in the tree. At the leaf-node level, whether it is an application protocol, an application, a file type, or the like, the leaf-nodes do not have any other child nodes. In one embodiment, a set of data packets representative of all possible network communications may be analyze to derive all the protocols used at each network layer, from the physical layer through the application layer and even including applications and file types if desired.

In an alternative embodiment, a pre-programmed protocol tree may be provided. This approach provides less flexibility to network modifications and a lower level of customization since only those protocols included in the tree may be used. In this embodiment, the protocol tree provider may periodically revise the protocol tree, for example with respect to new product versions, through periodic product updates (e.g., periodic downloads), and the like. In addition, customization may be possible but likely at a higher cost since the protocol tree may be modified for use by a smaller number of users (or customers).

In one alternative embodiment, the pre-programmed protocol tree may include nodes of "available" types to enable some level of user customization. For example, with respect to popular protocols, such as TCP/IP, a number of child nodes for popular recognized applications may be provided in the tree. In addition, a set of "available" application nodes may also be provided as children of the TCP protocol node. As further described below, upon the creation of a memory structure for traversing the protocol tree, a user may assign the "available" nodes to applications that are present in the user's network environment and not provided in the pre-programmed tree. Although limited to the number of available nodes provided in the pre-programmed tree, this feature allows some level of customization to the user's network environment.

Once the network infrastructure is been determined (or a default pre-determined model is selected), a protocol tree is build. Now referring to FIG. 7A, a functional block diagram illustrating a sample protocol tree according to one embodiment is shown. In this embodiment, in order to compile this protocol tree 700, a set of nodes 702 are made into a data array 704, for example in a memory location. Starting with a 0 offset in the array 704, a first set of bits are used for a header 706 for the protocol or UPID tree 700. The header 706 may be used as a descriptor of the UPID tree 700. The UPID header 706 may include, for example, information for managing the UPID tree (e.g., number of nodes, size, and the like), shortcuts 708 to most commonly used protocol nodes 702, and the like.

With respect to each node, a UPID 710 that identifies that node is provided. In one embodiment, the UPID 710 is an index to the array location where the node resides, for example, the memory offset with respect to the header 706 or with respect to the initial memory bit storing the array 700. In addition, for each node 702, the UPID of the parent node 711, of a sibling node 712, and of a first child node 714 are also stored. The number of child nodes 716 for every node is also stored. Additionally, an identifier of whether the node relates to an application or a protocol is also indicated 718, e.g., with a protocol/application or file flag. For example, a single bit may be used to indicate protocol node (bit=0) or application or file node (bit=1). Preferably, the protocol, application, or file type name 718 is also stored in the node 702.

Figure 7A:
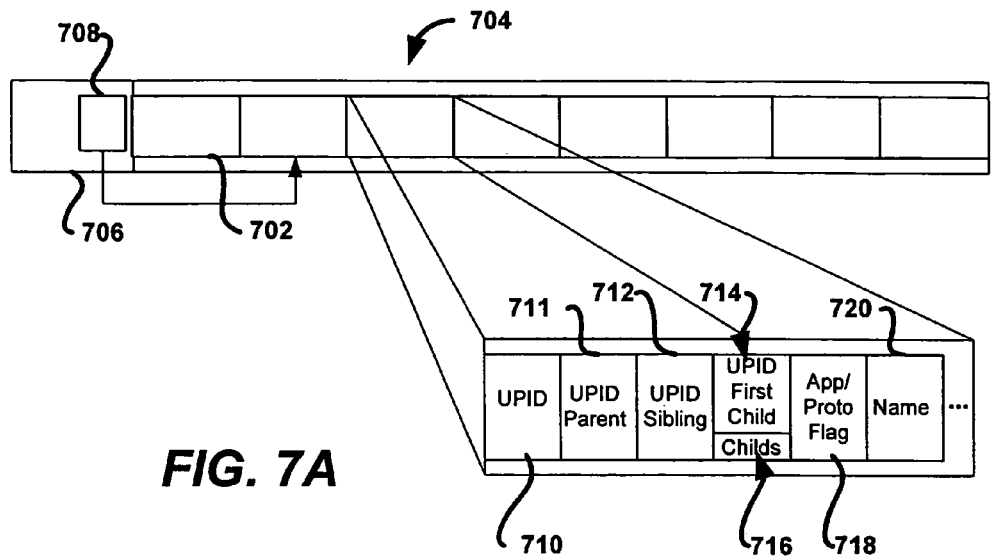
FIG. 7A shows a functional block diagram illustrating a sample protocol tree according to one embodiment.
Figure 7B:
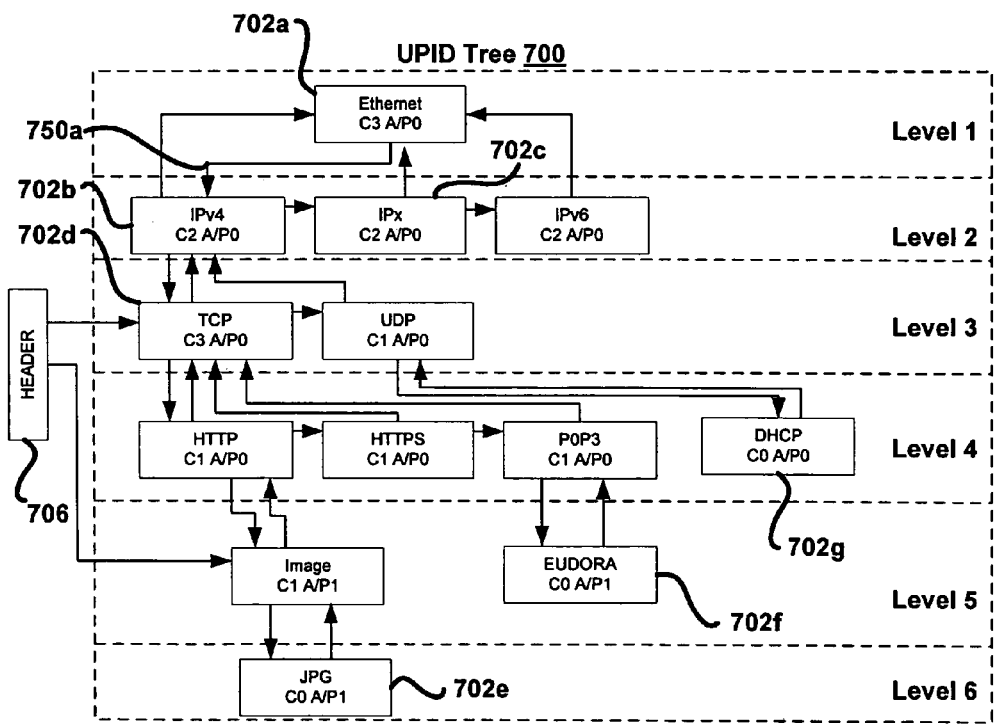
FIG. 7B shows a logical block diagram illustrating a sample UPID tree according to one embodiment.

FIG. 7B shows a logical block diagram illustrating a sample UPID tree according to one embodiment. The UPID tree 700 represents a 6 layer network protocol stack, for example for a simple web access and electronic mail network environment. With respect to the logical block diagram, the arrows represent the UPIDs of the node it points to. For example, the root node at level 1 is the Ethernet protocol node 702a, which has 3 child nodes (C3), the first of which, IPv4 702b, is pointed to by UPID arrow 750a. Similarly, node IPv4 702b includes UPID arrows for its parent node, Ethernet 702a, for one of its sibling nodes IPx 702c, and for on of its first child node TCP 702d, of the three child nodes (C3) it has. All of these nodes, being protocol nodes, include an application/protocol flag indicating the protocol value of zero (A/P0).

At the other end of the tree, leaf nodes 702e, 702f, and 703g, are each at a different level. At level 6, JPEG node 702e is for a file type commonly used in one or more applications. One level down, Eudora node 702f is an application node. Both of these nodes indicate application or file nodes with the A/P flag value of one (A/P1). At level 4, the DCHP node 702g is a protocol node for which no application nodes are available. All of these nodes point to their respective parent nodes which point back to them.

Figure 8:
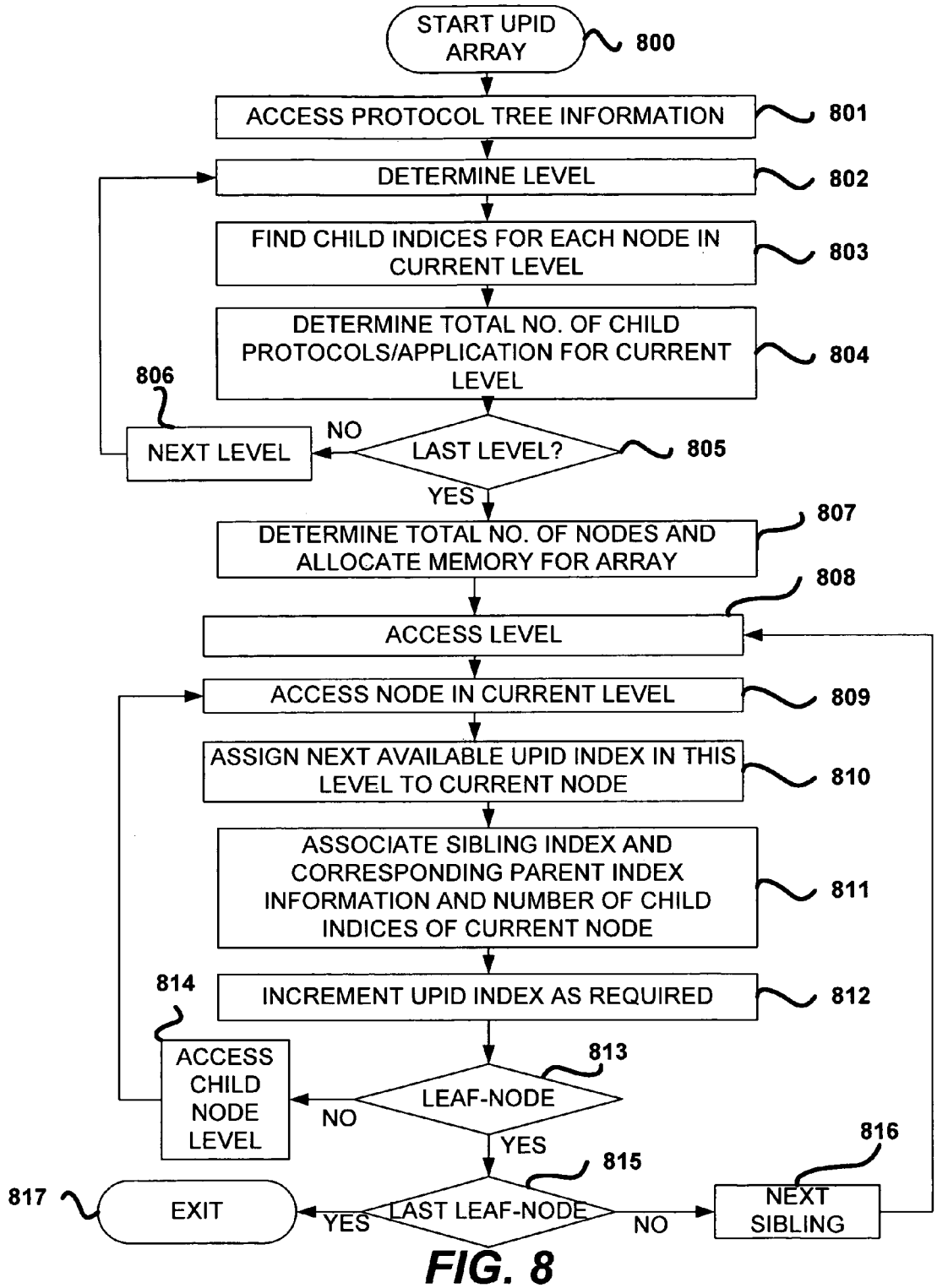
FIG. 8 shows a flow diagram illustrating a method to compose a UPID array in a memory according to one embodiment.

Now referring to FIG. 8, a flow diagram for a method to compose a UPID array in a memory according to one embodiment is shown. To initiate the process 800, protocol tree information is accessed 801. Preferably, a data file with a protocol tree description may be accessed, however, any alternative protocol tree information source may be used, e.g., custom tree, pre-programmed tree, or the like. The protocol tree information is traversed beginning with a first root level 802. For each node in the current level, the child protocols for the node are determined 803. Then the number of child protocols/applications for all the nodes in the current level are added to determine 804 the total number of child protocols or applications for the current level. While there are additional levels 805, the process repeats for each next level 806 until the last leaf level is reached, e.g., application or file type level. Preferably, this process is performed once at initialization time or any time there is a change to the protocol tree information.

Once the protocol tree information has been gathered, memory is allocated 807 based on the total number of levels and nodes per level. For example, in one embodiment, an array is created in memory with a heather section and a set of offset indices are created corresponding to each level of the tree. The offsets are separated by a predetermined number of bits corresponding to a node taking into account the number of nodes per level. Thus, in one embodiment using 32 bits per node, a first level with a single node would start at an offset of 0 while the second level would start at an offset of 32. Similarly, if the second level has two nodes, the third level offset would be 96 (32 of level 1+2 nodes*32 bits). In one embodiment, the memory offsets for each level are stored in a table along with the number of nodes per levels.

Once the memory has been allocated 807 for all the levels, the first level (e.g., root level) is accessed 808 by accessing the memory offset assigned for that level (e.g., 0). At the first offset, the first node for the level is created 809. The offset index is assigned 810 to the node. In addition, information required for the node is associated 811 with the node within the predetermined allocated node memory size, e.g., 32 bits. The information may include UPID offset values for siblings, parent, and first child node if any. The total number of child nodes, as determined at step 803, is also associated 811 with the node at this time. Once the current node is completed, the UPID index is incremented 812 with the next level value, for example, from the offset table. Until a leaf-node is reached 813, the first child in the next level is accessed 814 in a depth first conventional approach. Once the first leaf-node is reached, the process is repeated 816 for sibling node in the lowest possible level that has not been processed. Eventually, the last leaf-node 815 is reached and the array creation process ends 817. A sample resulting array structure according to this embodiment is shown in FIG. 7A.

As described above, some pre-programmed protocol tree embodiments may include "available" nodes for some protocol or applications that may be customized by the user. The UPID creation process described above creates nodes and assigns UPIDs in the array for these "available" potential protocol/application nodes. Subsequently, a user may associate the "available" UPIDs to user specific applications or protocols. For example, a graphical user interface in the monitoring console may include a pull-down menu with a representation of the pre-programmed protocol tree. For the available protocol/application or even file type nodes, a text box may be provided in which the user can enter a custom protocol/application or file type used in the user's environment. Upon entry of the name of the protocol/application/file type in the fill-in text box, the UPID array is updated with the entered name in the corresponding node. Subsequently, queries/filtering or any other data access through the UPID array is enabled based on the custom entry.

According to one embodiment, once the UPID array is created, the traffic data collection for monitoring only requires the storage of the UPID of the leaf node corresponding to the meta-flow. Generally, the meta-flow includes the UPID as the value for the protocol/application dimension. As shown below, any queries or other data access requiring information about the application/protocol lineage of the communication can be recreated using the UPID array based on the UPID of the leaf-node included in the meta-flow. Thus, according to this embodiment, a minimalist data collection approach only requires collecting network traffic measures with respect to the meta-flow and corresponding leaf-node.

Query-Based Rollup Using UPID Tree

In one embodiment, a network monitoring system is configured to process queries, for example, a default set of queries that generate a graphical user interface, user defined queries, or the like. Generally, queries include designations for a desired group (e.g., top or bottom, best performing, fastest, slowest, or the like). A quantifier N specifies the size of the resulting sample, e.g., top 10, fastest 100, and the like). Next a dimension D can be specified to qualify the nature of the resulting group to be displayed. The operator OP with respect to which the query is run is also specified. The operator may be simply one of the measures available in the traffic data indexing area or may be a combination of measures based on a arithmetical/logical operator computed over available measures. In addition, a filter can also be optionally included to limit the results to a particular set of meta-flows that meet the filter criteria. For example, one or more dimension values can be specified for one or more desired dimensions. In one embodiment, the filter is logically ORed for values within the same dimension and logically ANDed with for the dimensions specified in the filter. In addition, as an option any number of additional measures can be specified for display. One example of a generalized query statement may be given as follows:

Query=[TOP/BOTTOM] [N] [DIMENSION] BY [OP] FOR [FILTER] WITH [MEASURES]

For example, a query may be for the top 10 servers by total packets for servers with more than 200,000 total packets (additional measures, like response time, server delay, no. of retransmissions, or the like, may also be requested for display). For a more in depth description of a query processing system and method reference is made to co-pending U.S. patent application Ser. No. 11/134,808 titled "HyperLock Technique for High-Speed Network Data Monitoring" which incorporated by reference above.

Figure 9:
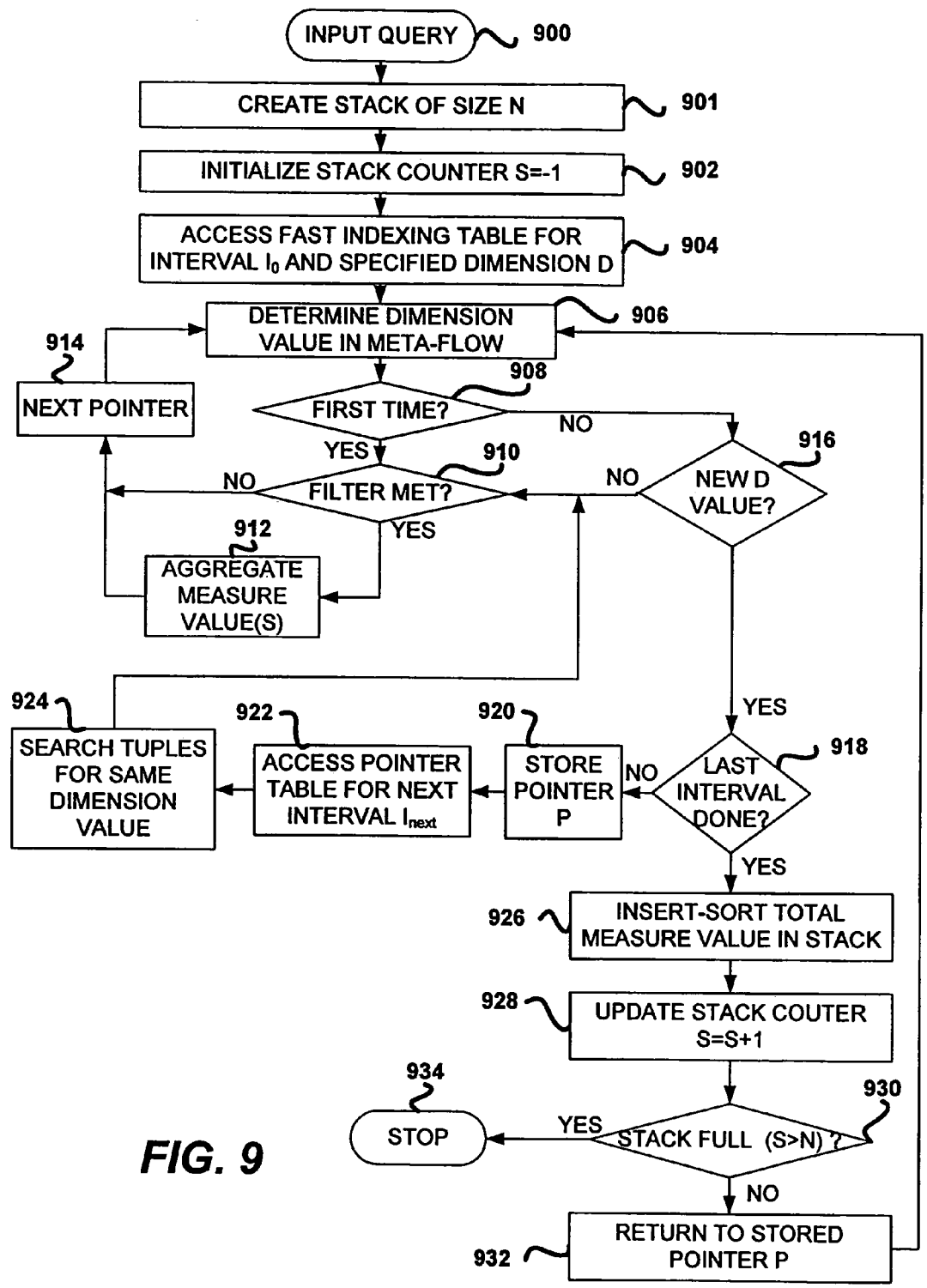
FIG. 9 shows a flow diagram illustrating a method for monitoring network traffic according to one embodiment.

With respect to queries indicating a protocol/application dimension as the queried dimension, the measures for the queried protocol, application, or even file type can be rolled up with respect to the queried dimension based on the UPID tree described above. Now referring to FIG. 9, a flow diagram illustrating a method for monitoring network traffic according to one embodiment is shown. In this embodiment, upon receipt 900 of a query, a stack of a size determined by the query (N) is created 901, e.g., top 10 means N=10, and a stack counter (S) is initialized 902. The query includes a filter condition based on a protocol/application/file type that has a UPID in the UPID array for the system. The fast indexing data structures are accessed 904 with respect to a first time interval $I_0$, e.g., the oldest interval in time, and for the dimension D specified in the query. The DNE memory location pointed to by the first pointer in the table is accessed to determine 906 the value for that dimension D. The first time accessing the DNE 908, if the filter conditions, if any, are met 910, the operator OP is applied to the appropriate measures and its result is stored 912 in a temporary memory location.

Figure 10A:
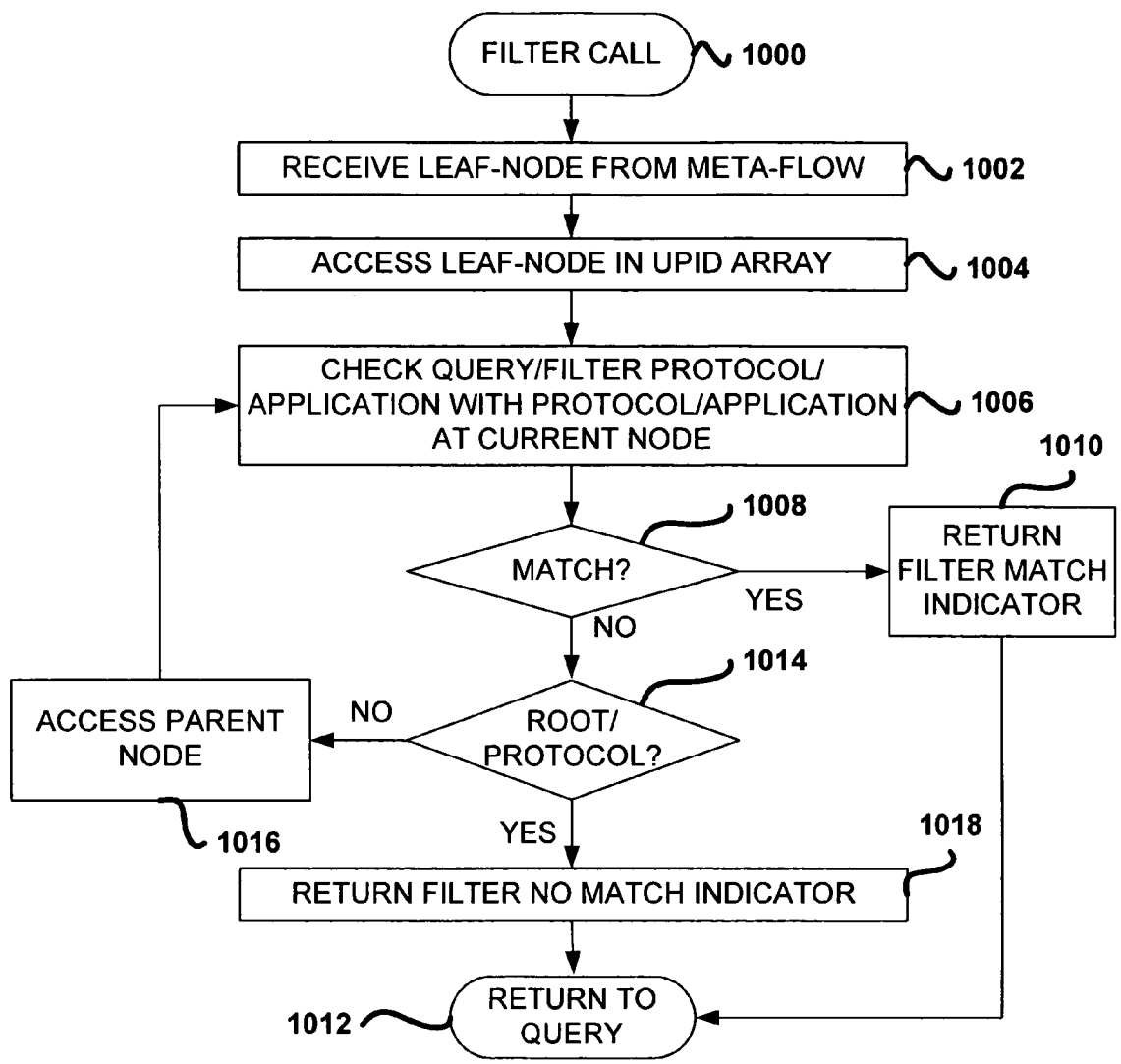
FIG. 10A shows a sample UPID tree process for aggregating query based measures according to one embodiment.

When the filter includes a filter condition of a protocol/application/file type, based on the UPID of the protocol/application or file type, a UPID tree process is activated. FIG. 10A shows a sample UPID tree process for aggregating query based measures according to one embodiment. The filter check step 910 activates a filter call 1000. The leaf-node UPID is received 1002 from the meta-flow being checked. The UPID array is accessed 1004 at the offset given by the UPID of the leaf-node. The UPID of the node is checked 1006 against the UPID specified in the filter/query. If the UPID matches 1008 the UPID specified for the filter/query, a filter match condition is returned 1010 to the query process and the UPID process is terminated 1012.

In one embodiment, this step is omitted by directly comparing the leaf-node UPID values in the meta-flows and determining a match condition without accessing the UPID array. However, if the UPID indicated in the filter/query is not a leaf-node UPID, the UPID process is accessed.

At step 1008, when the UPID of the filter/query is not a leaf-node, a match 1008 does not take place on the first pass. The process continues to check whether the UPID in the current node of the array corresponds to the root node (e.g., UPID offset=0). If the current node is not the root node, the parent node for the current node is accessed 1016 from the UPID offset stored in the current node. The process is repeated at step 1006 checking if the current node (now the parent) matches the filter/query specified protocol or application. If a match is found 1008, a match indicator is returned to the query process so that the measures for the current meta-flow are used to aggregate with the total time aggregated value. Conversely, if the root node is reached without a match 1014, a no match indicator is output 1018 the operation returns to the query process 1012. In this case, the current meta-flow measures are not used to aggregate for the processing query.

In an alternative embodiment, the filter/query UPID may indicate a UPID for either a protocol or an application. The UPID array includes a flag for each node that indicates whether it corresponds to a protocol or to an application. In this embodiment, when a UPID for an application node is specified in the query/filter, the application indicator for nodes in the UPID array is checked 1014. Once the indicator for a current node indicates that it no longer corresponds to an application, the "no match" indicator is returned 1018, because nodes lower in the protocol tree cannot be the specified query/filter application node. This embodiment optimizes the performance of the method when the query or filter is based on applications as opposed to protocols.

The query process continues at step 910 with the output of the UPID process (e.g., filter match or no match indicator) and any additional filter conditions that may be specified in the query.

In an alternative embodiment, the process described with respect to FIG. 10A may be implemented directly as part of the query process. For example, a query may simply request a measure based operator for a particular lower level protocol. The process described in FIG. 10A may be combined with the operator aggregation steps and all the meta-flows stored for the current time interval may be processed through the UPID process to generate an aggregate value for the protocol/application requested. In these embodiment, the end result after implementing the UPID array process of FIG. 10A is a measure or operator value rolled up with respect to the protocol or application specified by only taking into account measures of meta-flows with leaf-nodes having the specified protocol or application in its lineage.

Figure 10B:
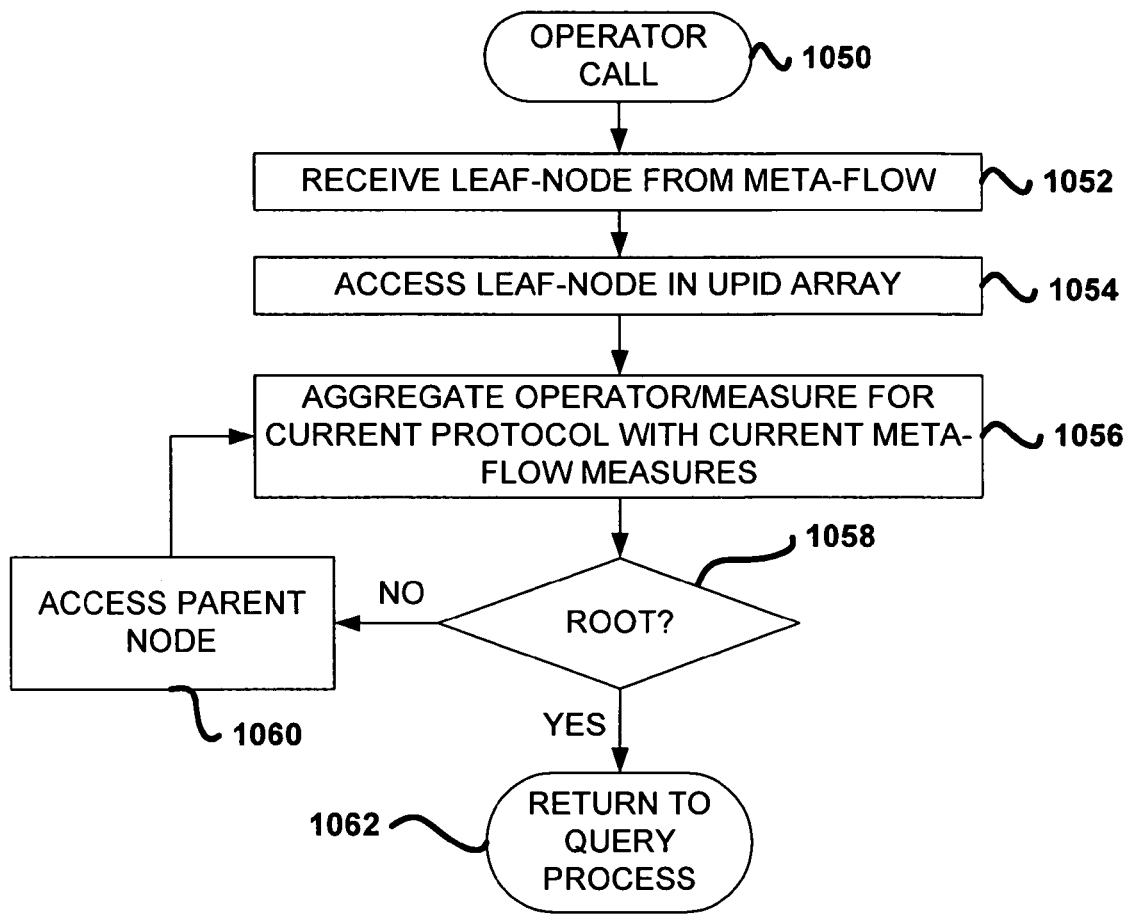
FIG. 10B shows a flow diagram of one sample measure aggregation process based on a UPID array according to one embodiment.

Moreover, in an alternative embodiment, a protocol/application based operator may be specified requesting an operator value be specified at each and every protocol/application level. In this case, a modified measure aggregation step 912 may be implemented according to one embodiment. FIG. 10B shows a flow diagram of one sample measure aggregation process based on a UPID array according to one embodiment. Once it has been determined that the measures associated with a meta-flow should be used for aggregating, an operator (call is issued 1050. The leaf-node UPID for the meta-flow is received 1052 and the UPID array is accessed 1054 at the offset indicated by the received leaf-node UPID. The operator is implemented 1056 with the meta-flow measures. An operator value is created with respect to the current protocol by associating the operator result with the UPID of the current node or if a value was already associated with the current UPID, it is aggregated with the measures of the current meta-flow. If the current node is not 1058 the root node, the parent node indicated by the parent UPID offset in the current node is now accessed 1060. Again the operator value is associated 1056 with or aggregated with the value for the current UPID (now of the parent). For each parent node in the array between the leaf-node and the root the operator result is associated with or aggregated with the node UPID. Once the root node is reached 1058, the aggregation process ends 1062 returning to the query process for accessing the next meta-flow.

As is the case with respect to the UPID process of FIG. 10A, the protocol based aggregation process of FIG. 10B may also be implemented as a stand alone query according to one embodiment. In this embodiment, the meta-flows are directly accessed and their measures aggregated with respect to each protocol node based on a specified operator following the UPID array.

Referring back to FIG. 9, after the filter match and measure/operator aggregation steps are completed, the next 914 pointer to the next meta-flow is accessed and the match and aggregation techniques described above are repeated with respect to the next meta-flow.

In addition, if additional measures are also specified for displayed, e.g., [MEASURES] in the query, temporary memory locations are created for storing those measures and the measures are similarly aggregated using the UPID array process and stored. Then the next pointer is found 914 and the process is repeated from step 906 until new dimension D value is reached.

After the first time the process is implemented 908, the value determined 906 for the dimension D is checked 916 to determine if it has changed from the previous value. For as long as the value does not change, the process is repeated checking 910 the filter conditions and aggregating with the previous measure/operator values within the same time interval (I).

Once a new value for the queried dimension D is found 916 in the current interval I, as long as the current interval is not 918 the last, e.g., most recent, interval I, the pointer value is stored 920 in a temporary pointer store P. The fast indexing table for the next interval $I_{next}$ for the specified dimension is accessed 922. The pointers in that table are used to access the corresponding interval bucket in the indexing area to find 924 the same value for the queried dimension D. Once the desired value is found 924, the filter is evaluated 910 and the process repeats traversing down the fast indexing pointer table for the interval until a new value for D is found 916. Because the pointers are sorted by the queried dimension D, once the first pointer to the appropriate value is found, only subsequent pointers could point to the same value. Thus the this process traverses from interval bucket to interval bucket in the indexing area aggregating the operator values from the multiple interval periods with respect to each value for the queried dimension D.

When every interval I has been accessed 918 aggregating the operator/measure values, the total aggregated value or values per specified protocol/application/file type are inserted 926 in the appropriate position in the stack, depending on whether the "top" or "bottom" group was queried for. The insertion may preferably be a sorted insertion; however, a quick sort of the stack may be done after each insertion. Once the final operator/measure values are inserted in the stack, the stack counter is updated 928, and if it exceeds 930 the total size N, the process ends 934 because the top or bottom group of size N has been already determined. Otherwise, the process is repeated going back 932 to the stored pointer P in the corresponding interval and aggregating operator/measure values for the next value of the queried dimension D across all intervals until the stack is full 930.

Once the query is fully processed, rolled up data along the queried dimension D is available in the stack, optionally including additional measures. The rolled up data may be displayed on a graphical user interface ("GUI") as shown in FIG. 11A.

Figure 11A:
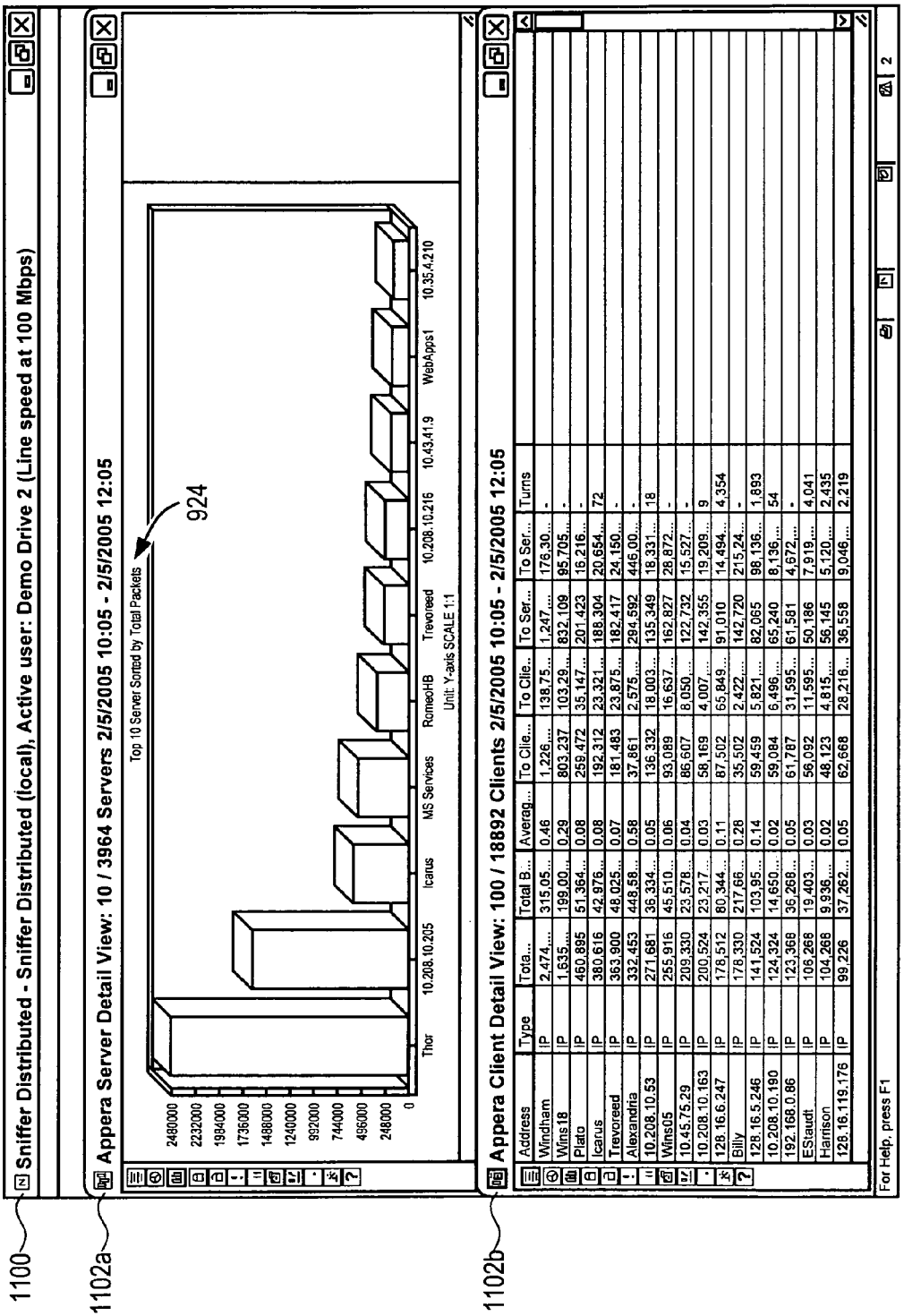
FIG. 11A and FIG. 11B show sample screen captures of a graphical user interface for a network traffic monitoring console according to one embodiment.

Referring now to FIG. 11A, a sample screen shot for a graphical user interface according to one embodiment is shown. An application window 1100 for a network monitoring application, e.g., Sniffer® Distributed, displays a plurality of views 1102. In one view 1102a, the top 10 servers by packet size are displayed in a bar graph. The query 924 is displayed at the top of the view window. Another view window 1102b shows a listing of the top 100 clients by total packets using IP protocol (filter) with additional measures, total bytes, average response time, and the like. Preferably, every time data is updated, i.e., every SI update period (e.g., one minute), the query is re-processed and the display is updated.

Figure 11B:
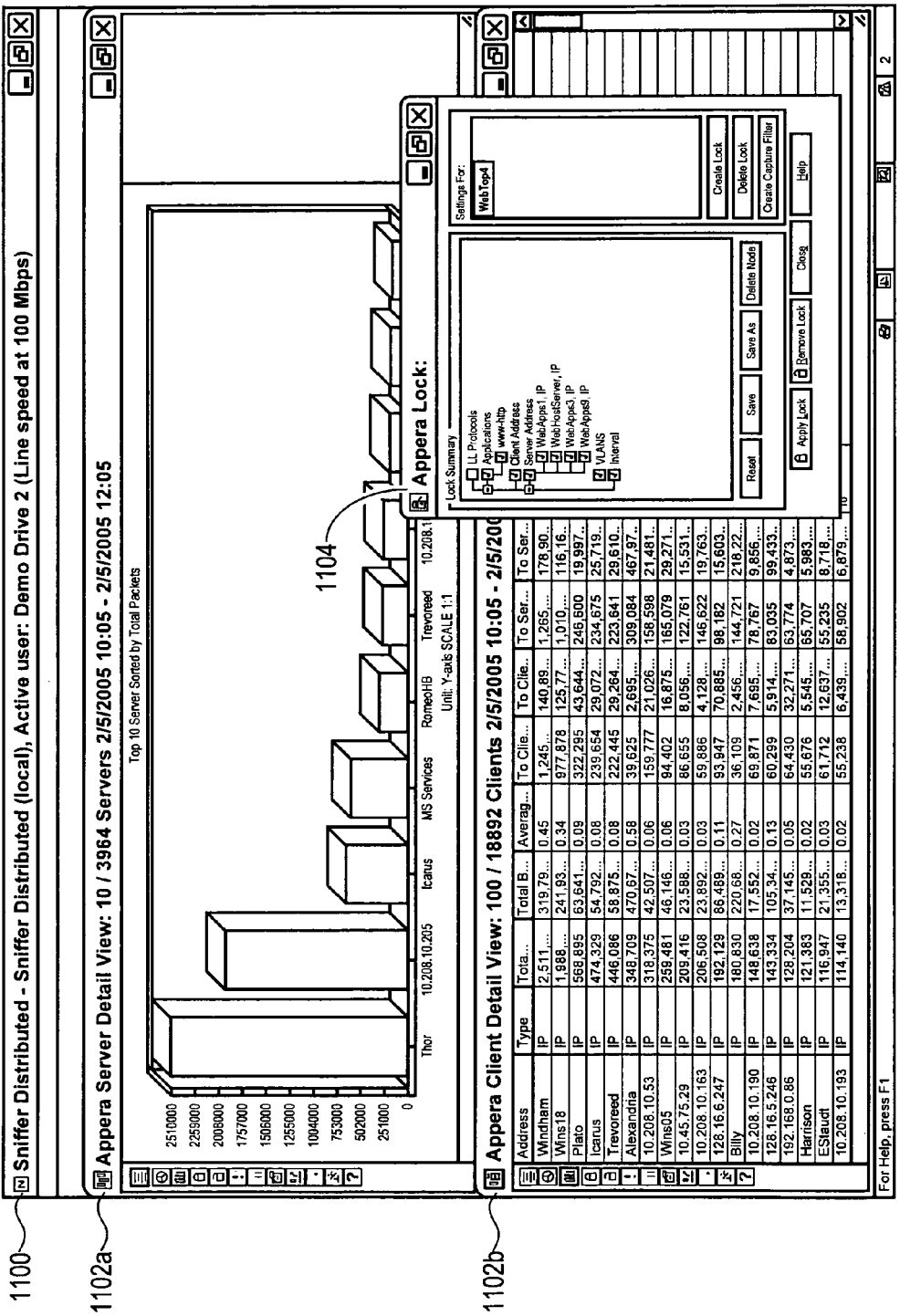

According to one embodiment, any number of these views 1102 can be shown to display the data according to multiple query results. As mentioned above, a default set of queries can be generated automatically for the standard display in the monitoring GIU 1100, e.g., top 10 clients, top 10 servers, top 10 virtual circuits, and the like. Moreover, a user menu for configuring a "lock" can be provided to modify the default queries or generate new queries to pivot the data along the dimensions and values of interest to the user. For example, with reference to FIG. 11B, in one embodiment, a window check box menu 1104 is provided for the user to select dimensions and associated values with respect to which "Hyper-Lock" the traffic data thereby producing a customized view of real-time traffic data (every update cycle). The new view is created virtually instantaneously upon the user's application of the lock by executing the query based on the fast index tables. More over, the view can be progressively locked to different conditions as the user drills down in the data evaluating a particular problem by simply modifying the desired check-box in the lock menu and reapplying the lock. When the conditions relate to the protocol/application dimension specifying protocols or application down in the lineage from the leaf-nodes, the UPID array processes described above are implemented.

According to one embodiment, as the query conditions are modified according to the user selected lock dimensions and values, a plurality of views 1102 can be modified to respond to the changes in lock variables. This zoom correlation technique across multiple windows advantageously allows the user to monitor multiple aspects of network traffic simultaneously and evaluate the effects of changing lock parameters on the various views at the same time.

According to another aspect of one embodiment, lock profiles are stored with customized locks created by the user. Moreover, preferably, different view windows 1102 can be associated with different user defined or default locks to provide either default or customized views of the meta-flow traffic on the monitoring console as desired by the user.

In one embodiment, the lock parameter menu is further enhanced to provide a "query service" interface. In order to support third party interfaces, a generic query interface is defined. This query interface defines the dimensions, measures, the sorting order (ascending/descending), available filter sets, and the like. A query parsing engine parses query interface generated queries and converts them into the optimized internal format. The indexing area is then scanned based on the ordered pointer fast indexing tables according to the techniques described above. The resulting data is rolled up into response buffers and output to the third party interface. Preferably, to ensure data consistency, the indexing area and fast indexing data structures are updated synchronously, using the native locking mechanisms with rollup as described above.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for collecting network traffic data, the method implemented on a computer, the method comprising:
    deriving a protocol tree structure;
    generating a protocol identifier array from information derived from the protocol tree structure, wherein the protocol identifier array comprises storage for a plurality of levels, each level including one or more nodes each associated with a protocol identifier each node further comprising a protocol identifier corresponding to a parent node, wherein the protocol identifier array is a one-dimensional array and the protocol identifier of a node is an index to a location in the protocol identifier array containing the node, the generating performed by a processor of the computer; and
    storing the protocol identifier corresponding to a leaf node in the protocol identifier array in a data object associated with network traffic data for a network communication between two end points.

2. The method of claim 1, wherein deriving the protocol tree structure comprises accessing a pre-programmed protocol tree data file.

3. The method of claim 2, wherein the pre-programmed protocol tree data file further comprises one or more unassigned available tree nodes for user customization.

4. The method of claim 3, wherein the one or more unassigned available tree nodes correspond to one or more nodes in the protocol identifier array, the nodes in the protocol identifier array configured to be associated is a custom protocol of the user.

5. The method of claim 4, wherein the custom protocol of the user includes one of a network communication protocol, an application, or a file type.

6. The method of claim 1, wherein deriving the protocol tree structure comprises accessing network traffic data to extract protocol information with respect to a network environment.

7. The method of claim 1, wherein at least one node in the protocol identifier array is associated with a protocol identifier corresponding to an application level protocol.

8. The method of claim 7, wherein the node comprises an application flag indicating that the node corresponds to an application.

9. The method of claim 1, wherein at least one node in the protocol identifier array is associated with a protocol identifier corresponding to an application.

10. The method of claim 1, wherein at least one node in the protocol identifier array is associated with a protocol identifier corresponding to a file type.

11. The method of claim 1, wherein each node further comprises a name corresponding to one of a protocol, an application, or a file type.

12. The method of claim 1, wherein each node further comprises a number of child nodes associated with the node.

13. The method of claim 1, wherein creating the protocol identifier array further comprises:
   accessing the protocol tree structure to determine a number of levels, a number of nodes per level, and a number of child nodes per node in each level;
   allocating storage space for the protocol identifier array, the storage space dimensioned to store the total number of nodes, the storage space further configured in storage sections, each section associated with one of the plurality of levels, wherein each section is associated with a protocol identifier corresponding to the storage offset from a starting storage location of an initial section to a starting storage location of the section;
   assigning the protocol identifier of the section to a first node within the section; and
   associating a sibling protocol identifier, a parent protocol identifier, a child protocol identifier and a number of child nodes with the first node.

14. A method for monitoring network data traffic, the method implemented on a computer, the method comprising:
   receiving a leaf node protocol identifier from a data object associated with network traffic data for a network communication between two end points, the data object comprising one or more network traffic measures associated with the network communication;
   accessing a leaf node in a one-dimensional protocol identifier array using the leaf node protocol identifier as an index to a location in the protocol identifier array, the protocol identifier array including a plurality of nodes representing a protocol tree structure, each node including a protocol identifier of a parent node for traversing the protocol identifier array from the leaf node to a root node identifying a lineage of protocols associated with the network communication;
   traversing the protocol identifier array from the leaf node to each successive parent node comparing each node's protocol within the lineage of protocols with a queried protocol to find a matching protocol, the traversing performed by a processor of the computer; and
   in response to finding the matching protocol, aggregating a value based on the one or more network traffic measures of the data object.

15. The method of claim 14, wherein the queried protocol is every protocol in a lineage and further wherein the aggregating of the value is performed with respect to every protocol in the lineage of protocols of the network communication.

16. The method of claim 14, wherein the protocol identifiers correspond to an offset from an initial location of the protocol identifier array to an initial location of each of the plurality of nodes in the protocol identifier array.

17. The method of claim 14, further comprising determining a no match condition in response to traversing the protocol identifier array to the root node without finding the matching protocol.

18. The method of claim 14, wherein at least one of the plurality of nodes corresponds to an application, wherein the at least one of the plurality of nodes corresponding to an application further comprises an application node identifier.

19. The method of claim 18, wherein the a queried protocol correspond to an application, and further comprising determining a no match condition in response to traversing the protocol identifier array to a node without an application node identifier without finding the matching protocol.

20. A system for collecting network traffic data comprising:
   a processor;
   means for generating a protocol identifier array from information derived from the protocol tree structure, wherein the protocol identifier array comprises storage for a plurality of levels, each level including one or more nodes each associated with a protocol identifier each node further comprising a protocol identifier corresponding to a parent node, wherein the protocol identifier array is a one-dimensional array and the protocol identifier of a node is an index to a location in the protocol identifier array containing the node, wherein the generating is performed at least in part by the processor; and
   means for storing the protocol identifier corresponding to a leaf node in the protocol identifier array in a data object associated with network traffic data for a network communication between two end points.

21. A system for monitoring network data traffic comprising:
   a processor;
   means for receiving a leaf node protocol identifier from a data object associated with network traffic data for a network communication between two end points, the data object comprising one or more network traffic measures associated with the network communication;
   means for accessing a leaf node in a one-dimensional protocol identifier array using the leaf node protocol identifier as an index to a location in the protocol identifier array, the protocol identifier array including a plurality of nodes representing a protocol tree structure, each node including a protocol identifier of a parent node for traversing the protocol identifier array from the leaf node to a root node identifying a lineage of protocols associated with the network communication;
   means for traversing the protocol identifier array from the leaf node to each successive parent node comparing each node's protocol within the lineage of protocols with a queried protocol to find a matching protocol, wherein the traversing is performed at least in part by the processor; and
   means for, in response to finding the matching protocol, aggregating a value based on the one or more network traffic measures of the data object.

22. A computer-readable storage medium storing executable computer program instructions for collecting network traffic data, the computer program instructions adapted for:
   generating a protocol identifier array from information derived from the protocol tree structure, wherein the protocol identifier array comprises storage for a plurality of levels, each level including one or more nodes each associated with a protocol identifier each node further comprising a protocol identifier corresponding to a parent node, wherein the protocol identifier array is a one-dimensional array and the protocol identifier of a node is an index to a location in the protocol identifier array containing the node; and storing the protocol identifier corresponding to a leaf node in the protocol identifier array in a data object associated with network traffic data for a network communication between two end points.

23. A computer-readable storage medium storing executable computer program instructions for monitoring network traffic data, the computer program instructions adapted for:

receiving a leaf node protocol identifier from a data object associated with network traffic data for a network communication between two end points, the data object comprising one or more network traffic measures associated with the network communication;

accessing a leaf node in a one-dimensional protocol identifier array using the leaf node protocol identifier as an index to a location in the protocol identifier array, the protocol identifier array including a plurality of nodes representing a protocol tree structure, each node including a protocol identifier of a parent node for traversing the protocol identifier array from the leaf node to a root node identifying a lineage of protocols associated with the network communication;

traversing the protocol identifier array from the leaf node to each successive parent node comparing each node's protocol within the lineage of protocols with a queried protocol to find a matching protocol; and in response to finding the matching protocol, aggregating a value based on the one or more network traffic measures of the data object.

* * * * *